3,146,281
PRODUCTION OF ROUND PARTICLES OF
CERAMIC MATERIAL
Casimer W. Krystyniak and Angelo T. Muccigrosso, Schenectady, and George L. Ploetz, Scotia, N.Y., assignors to the United States of America as represented by the United States Atomic Energy Commission
No Drawing. Filed Jan. 31, 1963, Ser. No. 256,195
2 Claims. (Cl. 264—21)

This invention deals with a process of producing and fabricating round particles of ceramic materials, for instance of boron carbide, $B_4C$.

Boron carbide is used in nuclear reactors as a so-called poison on account of its high neutron-capture cross section. The poison is usually embedded in the fuel material, for instance a uranium-containing zirconium alloy, and the mass is then shaped into fuel elements by hot extrusion.

In order to make accurate calculations possible of the quantities of boron carbide necessary in certain amounts of fuel, the particles have to be of regular and uniform size. The particles of poison should be of spherical shape, because then they have a minimum of surface area and thus also suffer a minimum of radiation damage. Also, the particles have to be strong so that they are not crushed during extrusion. String formation, or, as it is called in the art, stringering, should not occur during extrusion.

It is an object of this invention to provide a process for the production of spherical uniform boron carbide particles which do not break up or crush during metallurgical processing steps, such as hot extrusion of a metal matrix in which they are embedded.

It is another object of this invention to provide a process for the production of spherical uniform boron carbide particles which do not stringer during hot extrusion of the metal matrix in which they are embedded.

It is finally an object of this invention to provide a process for the production of spherical uniform boron carbide particles which are of a uniform and known particle size and retain it during fabrication steps so that accurate calculations are possible, on the basis of their average cross section, of the quantity necessary to obtain "selfshielding" in the reactor.

The process of this invention comprises mixing boron carbide with a binder, compacting the mixture, crushing the compacts, screening the crushed particles into various fractions, abrading the particles to round the surfaces, mixing the rounded particles with graphite, heating the graphite-boron carbide mixture to at least 2500° C. in an inert atmosphere, cooling to room temperature, screening the particles, abrading the particles to obtain smooth surfaces and classifying the particles into fractions of certain uniform sizes.

Any kind of boron carbide, $B_4C$, can be used for the process of this invention. A particle size of below 37 microns was usually preferred. A typical analysis of a suitable boron carbide is as follows:

| | Wt. percent |
|---|---|
| Boron | 78.71 |
| Carbon | 22.30 |
| Iron | 0.20 |
| Zirconium | 0.30 |
| Silicon | 0.01 |
| Nickel | 0.01 |
| Cobalt | 0.02 |
| All other impurities | 0.01 |

A binder found especially well suitable is a wax emulsion; only small quantities thereof are needed. For instance, about 16 cc. of the wax emulsion were satisfactory for binding 100 grams of $B_4C$.

This mixture was then compacted, for instance, in a steel die into bodies having a diameter and length each of one inch. The compacting pressure preferred was 20 t.s.i.

The compacts were then crushed and screened, whereby angular particles were obtained. These particles were then given a round surface by rolling or swirling them on a fine screen for approximately two hours.

Powdered graphite was then added to the spherical boron carbide, and the mass was mixed by rolling it in a small glass contained on a ball mill rack.

The suitability of zirconia and magnesia, instead of graphite, was investigated, but these materials did not prove satisfactory.

The above mixture was then loaded in a closed-end graphite crucible, and the latter was inserted between two water-cooled copper electrodes of a 10 kva. resistance furnace delivering 1000 amperes at 10 volts. The pressure was sufficient to maintain good electrical contact.

An inert atmosphere was maintained around the graphite crucible during the entire heating step to reduce oxidation of the graphite; nitrogen or argon was satisfactory for this purpose. The current was turned on and the crucible temperature was brought thereby to at least 2500° C., usually to about 2600° C.

A number of experiments were carried out varying the heating time within an interval of from 10 to 60 minutes; the optimum was found to be a heating period of 20 minutes.

After the current was shut off, the treated boron carbide mass was allowed to cool to room temperature in situ. Thereafter the charge was unloaded onto a 200-mesh screen to remove any loose graphite powder.

Tentacles of excess graphite and of fused boron carbide were then removed by rolling the mass in a stainless steel ball mill or else in a cylindrical drum lined with an abrasive material by introducing compressed air tangentially. Either treatment was continued until microscopic examination showed that the particles had a smooth surface.

The spheres were then classified as to size on a vibrating glass table. The amplitude of vibration and the angle of the glass plate were adjustable. Particles of the most perfect sphericity rolled off first; the less perfect ones formed the next fraction. The most irregular particles remained on the vibrating table. These could be reworked by recycling.

The particles made by the process of this invention were tested and compared with angular particles before spheroidization according to this invention. For this purpose, the fractions whose particles were between —70 and 140 mesh and had a diameter of between 100 and 200 microns were crushed in a Dillon Universal Tester; the weight required to crush these spheres was determined in each case. Twenty-five tests were carried out and the results were averaged. While the angular particles as received from the manufacturer resisted a crushing strength of 1.17 pounds only, the particles processed according to this invention required an average load of 3.49 pounds for crushing. The density of the products of the invention as determined with a mercury pycnometer was 2.23 grams/cm.$^3$, which is 89% of the theoretical density. X-ray diffraction analysis showed that the product consisted mainly of $B_4C$ with some excess of free graphite that was mainly concentrated near the surface of the spheres.

The material of this invention can be embedded in a metal matrix, for insance of a zirconium alloy, and can be hot-extruded and/or hot-rolled therein; due to their strength, the boron carbide particles retain their shape during such fabrication. For instance, at a temperature of 900° C. and a reduction ratio of 20:1, the spheres retained their shape.

It will be understood that, while the invention has been described primarily as applied to the spheroidization of nuclear fuel poison, it can be applied with equal satisfaction to other ceramic or refractory materials.

It will also be understood that the invention is not to be limited to the details given herein but that it may be modified within the scope of the appended claims.

What is claimed is:

1. A process of preparing spherical particles of a boron-carbide-base refractory material, comprising mixing boron carbide with a binder, compacting the mixture obtained, crushing the compacts formed into particles, abrading the particles to round their surfaces, mixing the rounded particles with graphite, heating the graphite-refractory mixture in an inert atmosphere to at least 2500° C., cooling to room temperature, abrading the mixture to smoothen the surfaces of the particles and separating the nonspherical particles from the spherical ones by vibration on a glass table.

2. The process of making bodies of nuclear fuel comprising embedding the spherical particles obtained by the process of claim 1 in a zirconium-uranium alloy and fabricating the alloy at elevated temperatures.

References Cited in the file of this patent

UNITED STATES PATENTS

| | | |
|---|---|---|
| 2,641,044 | Bearer | June 9, 1953 |
| 2,813,073 | Saller et al. | Nov. 12, 1957 |
| 3,051,566 | Schwartz | Aug. 28, 1962 |

OTHER REFERENCES

KAPL–2000–5, "Reactor Technology Report No. 8—Metallurgy," March 1959, pp. 73–92.

GEAP–3680, "Information on the Use of Boron Carbide as a Nuclear Control and Poison Material," March 15, 1961, pp. 3 and 9.

Volkov et al., "Use of Burnable Poisons in Nuclear Reactors," translated from Atomnaya Energiya, vol. 11, No. 2, pp. 109–125, August 1961, translation in Group 220 in 204—Burnable Poison Digest.